United States Patent [19]
Hatwar et al.

[11] Patent Number: 5,882,760
[45] Date of Patent: Mar. 16, 1999

[54] RECORDABLE OPTICAL DISKS WITH METALLIC INTERLAYER

[75] Inventors: Tukaram K. Hatwar, Penfield; Yuan-Sheng Tyan; George R. Olin, both of Webster, all of N.Y.

[73] Assignee: Eastman Kodak Company, Rochester, N.Y.

[21] Appl. No.: 971,969

[22] Filed: Nov. 17, 1997

[51] Int. Cl.$^6$ ........................................... B32B 3/00
[52] U.S. Cl. ........................ 428/64.1; 428/64.4; 428/64.8; 428/457; 428/913; 430/270.14; 430/270.17; 430/495.1; 430/945; 369/283; 369/288
[58] Field of Search .................... 428/64.1, 64.2, 428/64.4, 64.8, 457, 913; 430/270.14, 270.17, 495.1, 945; 369/282, 288

[56] References Cited

U.S. PATENT DOCUMENTS

| | | |
|---|---|---|
| 4,465,767 | 8/1984 | Oba et al. .............................. 430/270.1 |
| 4,490,618 | 12/1984 | Cielo . |
| 5,090,009 | 2/1992 | Hamada et al. . |
| 5,124,067 | 6/1992 | Itoh et al. . |
| 5,294,471 | 3/1994 | Evans et al. . |
| 5,325,351 | 6/1994 | Uchiyama et al. .................. 369/275.1 |
| 5,415,914 | 5/1995 | Arioka et al. ........................... 428/64.1 |
| 5,604,004 | 2/1997 | Suzuki et al. . |

*Primary Examiner*—Elizabeth Evans
*Attorney, Agent, or Firm*—Raymond L. Owens

[57] ABSTRACT

A recordable optical disk including a transparent substrate; a recording layer formed over the substrate; a reflective layer formed over the recording layer; and a thin metallic interlayer formed on the recording layer at the interface between the reflective layer and the recording layer wherein the thin metal interlayer includes materials selected from the group consisting of Pd, Ni, Sn, Au, In, Te, Si, Ge, and alloys thereof, the interlayer being selected so as to improve the optical disk recording stability without significantly affecting the reflection of a recording light beam passing through the substrate and the recording layer and which is reflected by the reflective layer.

10 Claims, 5 Drawing Sheets

RECORDABLE OPTICAL DISKS WITH METALLIC INTERLAYER

CROSS REFERENCE TO RELATED APPLICATIONS

The present invention is related to commonly assigned U.S. patent application Ser. No. 08/971,740 filed concurrently herewith entitled "Recordable Optical Disks With Dielectric Interlayer" to Hatwar et al. The disclosure of this related application is incorporated herein by reference.

FIELD OF THE INVENTION

The present invention relates to optical disks with improved recording stability.

BACKGROUND OF THE INVENTION

Optical disks are becoming increasingly prevalent for the use of recording information. One form of optical recording disks is CD-R or recordable compact disk. The Photo CD is an example of CD-R disk. Typically, this type of disk has a transparent substrate, a recording layer formed on a substrate, and a reflective layer on the recording layer. The recording layer is essentially a photo absorption material made of mixture of some organic dye materials and is deposited by spin coating. The recording materials used for CD-R applications have been described in U.S. Pat. Nos. 4,940,618; 5,604,004; 5,294,471; European Patent Application 0353393; and Canadian Patent 2,005,520. Commercially useful materials of the type described in these references have stringent requirements. One of the requirements is the light stability. Since Photo CD is a consumer product, it must be capable of withstanding extreme environment. The stability of the disk depends on the nature of the recording layer, the reflector layer, and their mutual interaction. The prior arts cited above disclose phthalocyanine dye, metallized formazan dye and cyanine dye that possesses excellent light stability. The reflecting layer is usually selected to be gold or gold alloy because of their inertness and high reflectivity. The CD-R specifications require that it has a high reflectivity of more than 60% similar to the compact disks.

During recording, writing laser light passes through the transparent polycarbonate substrate and is focused on the dye recording layer which is heated to change the dye material to form a mark. In other recording materials, recording pits are formed. The reflectivity of a mark is lower than those areas not having the mark. The light passes through the unrecorded area and is reflected back by the reflective layer. The record thus consists of marks of relatively low reflectivity on a background of relatively high reflectivity in relation to the read beam and further enhances the process of forming the mark.

Thin layer of gold is normally used as a reflecting layer. Gold is a noble metal with a very high stability and does not affect the recording stability. Materials other than gold such as aluminum, silver and copper and their alloys have high reflectivity but are not useable because they are reactive and can form oxides or other corrosion products. The data recorded in these types of disks degrades over time. However, materials such as silver are much less expensive than gold, and it would be highly desirable to use them.

SUMMARY OF THE INVENTION

It is an object of the present invention to provide an optical disk which uses a metallic reflective layer other than gold and meet the CD-R specifications.

These objects are achieved by a recordable optical disk comprising:

a) a transparent substrate;

b) a recording layer formed over the substrate;

c) a reflective layer formed over the recording layer; and d) a thin metallic interlayer formed on the recording layer at the interface between the reflective layer and the recording layer wherein the thin metal interlayer includes materials selected from the group consisting of Pd, Ni, Sn, Au, In, Te, Si, Ge, and alloys thereof, the interlayer being selected so as to improve the optical disk recording stability without significantly affecting the reflection of a recording light beam passing through the substrate and the recording layer and which is reflected by the reflective layer.

ADVANTAGES

It has been found, quite unexpectedly, that use of a thin metal interlayer at the interface between reflecting and recording layers can be selected so that other materials than gold such as silver can be used as a highly effective reflective layer.

Silver metal is relatively very inexpensive than gold and the disk can be manufactured at a substantially reduced cost.

The thin metal interlayer lends itself to high volume manufacturability.

DETAILED DESCRIPTION OF THE INVENTION

Figure 1:
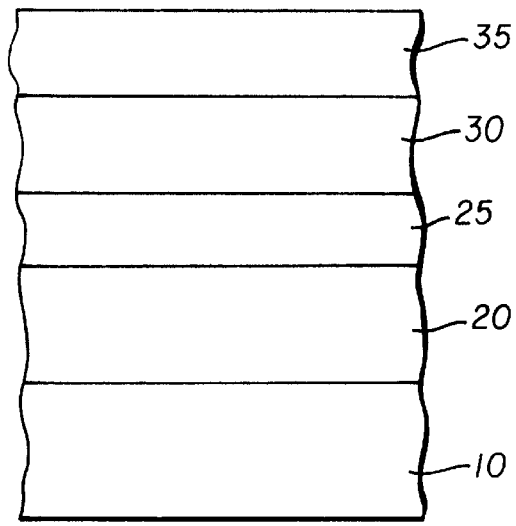
FIG. 1 shows a writable disk structure made in accordance with the present invention.

Turning to FIG. 1 is a structure of a writable compact disk made in accordance with the invention. It includes a substrate 10 which is made of polycarbonate and a dye recording layer 20. The recording layer 20 can include photosensitive material such as an organic phthalocyanine dye. The recording layer is deposited using a spin coating technique. On the recording layer 20 is provided a reflecting layer 30 which is formed of silver. The thickness of the reflecting layer generally is between 60 to 80 nm. Between the dye recording layer and the silver metal reflector is a metal interlayer 25 selected from the group consisting of Pd, Ni, Au, In, Si, Ge, and Te. On the metal reflector layer is provided a UV-curable overcoat lacquer protective overcoat 35. It has been found that interlayer thickness for Au can be effective in a range from 0.2 to 30 nm and are quite adequate to maintain the desired reflectivity and increase the thermal stability of the disks. When the interlayer material is Pd, Ni, Sn, In, Si, or Ge, the interlayer can be in a thickness range between 0.2 nm to 3 nm.

The thin films of Au, Ag, Pd, and Ni were prepared by sputter depositing using DC magnetron guns in an argon atmosphere. All metal layers were deposited on the dye recording layer under the same sputtering conditions. Then the UV-curable lacquer overcoat was spin coated on the reflecting layer. These disks were tested using Kodak PCD 600 6× writer/reader at 2.4 m/sec. for reflectivity (Rtop), window margin (WM), and other relevant parameters. Here Rtop, is a reflectivity measured by PCD-600 as the reflectivity of the unwritten land. Rtop is substantially lower than the true reflectivity because of birefringence, groove structure of the disk and the influence of the neighboring marks and tracks.

In general, jitter of a recorded feature is related to its ability of being detected without error during readback. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter (S) is a measure of the overall noise and is the square root of the variance of the distribution of detection time commonly modeled as a Gaussian curve. The distribution of detection time may not be exactly centered in the timing window, and the peak shift will increase the probability of a decoding error even for a narrow distribution. The window margin (WM) is a derived parameter involving jitter and peak shifts. The lower the jitter and peak shifts the higher is the WM. The WM can be viewed as a figure of merit in that the disc with higher WM has a greater probability of successful read back than the one with lower WM. Also the disc with higher WM is expected to be read back by a wider variety of readers than the one with lower WM that is otherwise similar.

Figure 2:
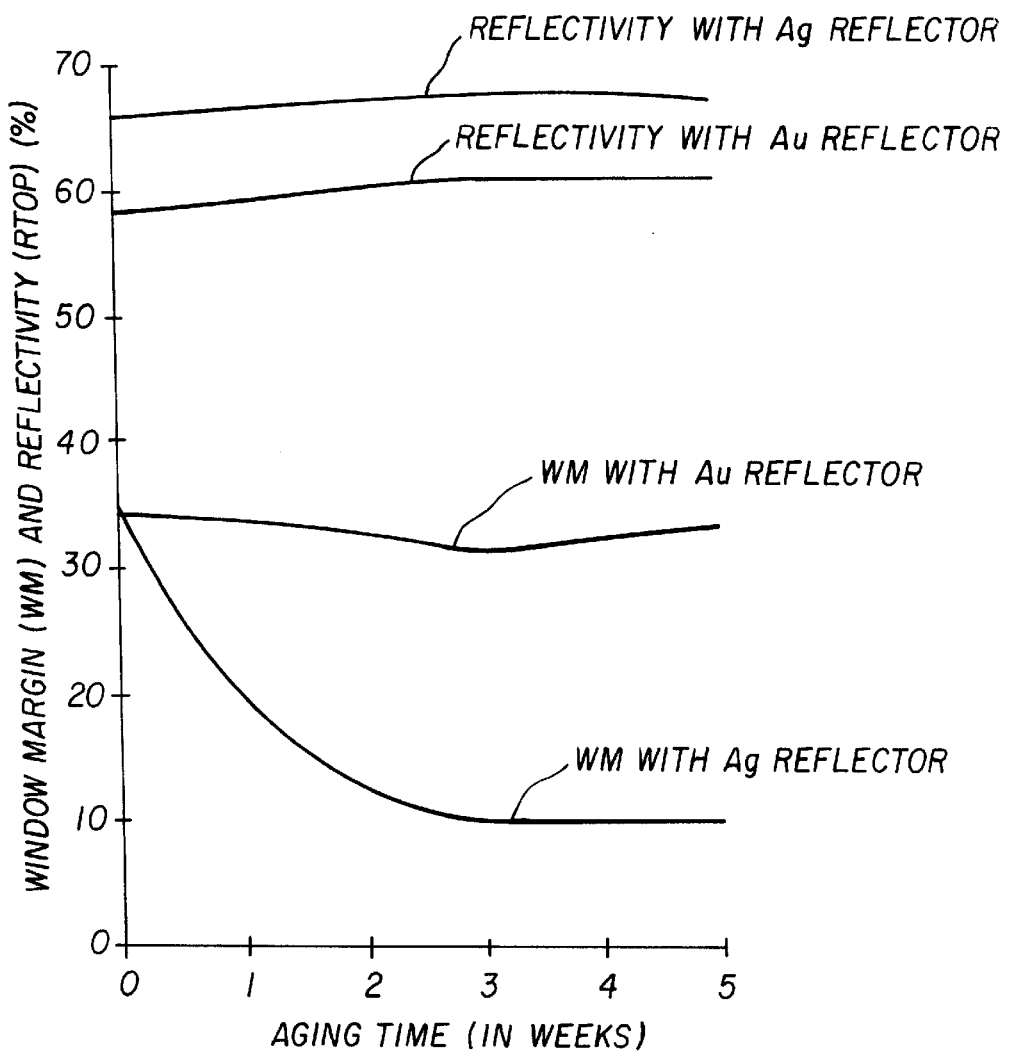
FIG. 2 shows a comparison of recording stability between two disks prepared using gold and silver metal reflectors.

Several full structure disks were prepared using different combination of interlayers and the reflectors. FIG. 2 shows the comparison of the thermal stability of the two disks prepared using gold and silver metal reflectors. Au is noble and provides a long term stability for the recording layer. Silver metal has higher reflectivity than the gold. These disks were incubated at a temperature of 80° C. and 85% relative humidity. The marks were read back after periodic interval of aging. Both disks show increase in the reflectivity as measured through the polycarbonate substrate. The window margin which is a figure of merit for these disks shows a dramatic decrease for the disk with the silver reflector. The Window Margin for a disk with the gold reflector indicate almost no change. Thus silver metal when directly deposited on the dye recording layer does not provide long tenstability to the CD-R disk. The reason for the degradation of the performance for the disk using silver reflector can be seen from the small and large mark jitter as function of aging time. The small mark jitter decreases while large mark jitter increases with the aging time. There also is a phenomenon of mark growth possibly due to the interfacial interaction and/or the poor adhesion between the silver metal and the dye recording layer. It has been found, quite unexpectedly, that the thermal stability of the disk using silver reflector dramatically increased when a thin layer of Pd, Ni, Au, In, Si, Ge, or Te metal was deposited prior to the deposition of the silver reflecting layer. Thin interlayers of several metals and semi-metals were used from the group of: Pd, Ni, Au, Ge, Si, Te, In, Cu, Cr, Ta, Pt, Ir, Sn, Ti, Ru, Al, Nb, and Co. Series of disk were prepared using varying thickness of the interlayer to give high reflectivity and the WM. Accelerated aging test were carried using dry and wet conditions: 95° C.; and 80° C. and 85% relative humidity (RH).

Figure 3:
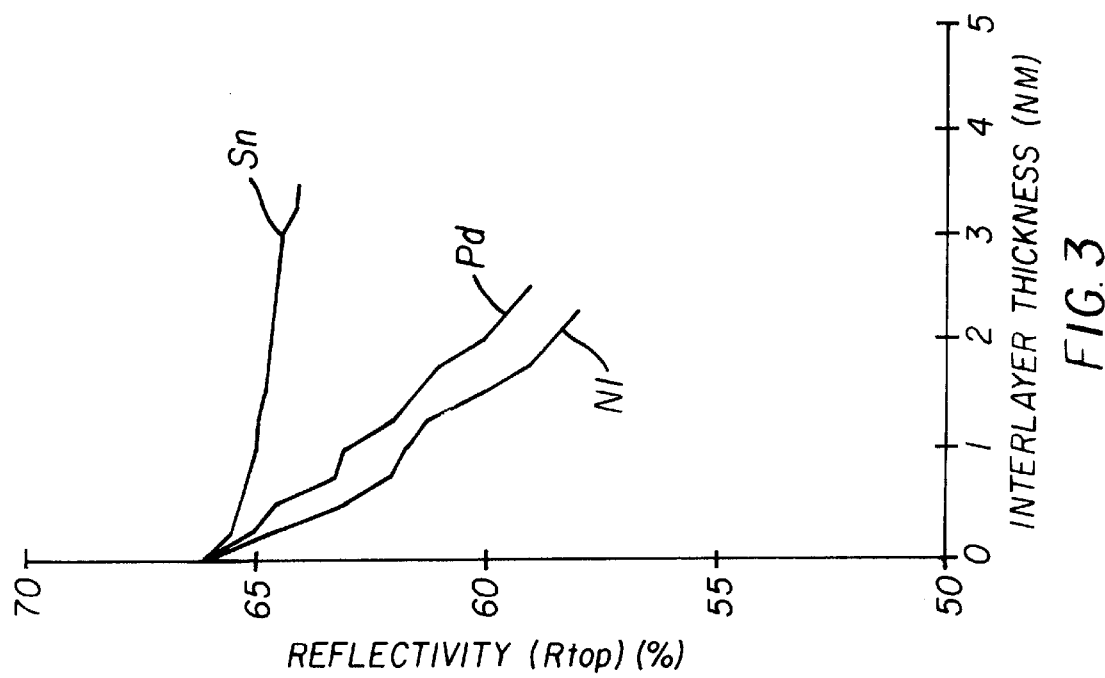
FIG. 3 is a graph of reflectivity vs. interlayer thickness for Pd, Ni, and Sn materials.

FIG. 3 shows the disk reflectivity as a function of Pd, Ni, and Sn metal interlayer thickness. The disk reflectivity is very high without any interlayer thickness. This reflectivity is about 5–7% higher than that obtained using the gold layer as a reflector. When the thickness of interlayer was increased from 0.2 nm the 1 nm, the disk reflectivity decreases monotonically, but it is still higher than that obtained from the control disks with the gold reflector. When interlayer thickness is larger than 3 nm, a significant loss in the reflectivity was observed. Thus Pd, Ni and Sn metal thickness were limited to 3 nm.

Figure 4:
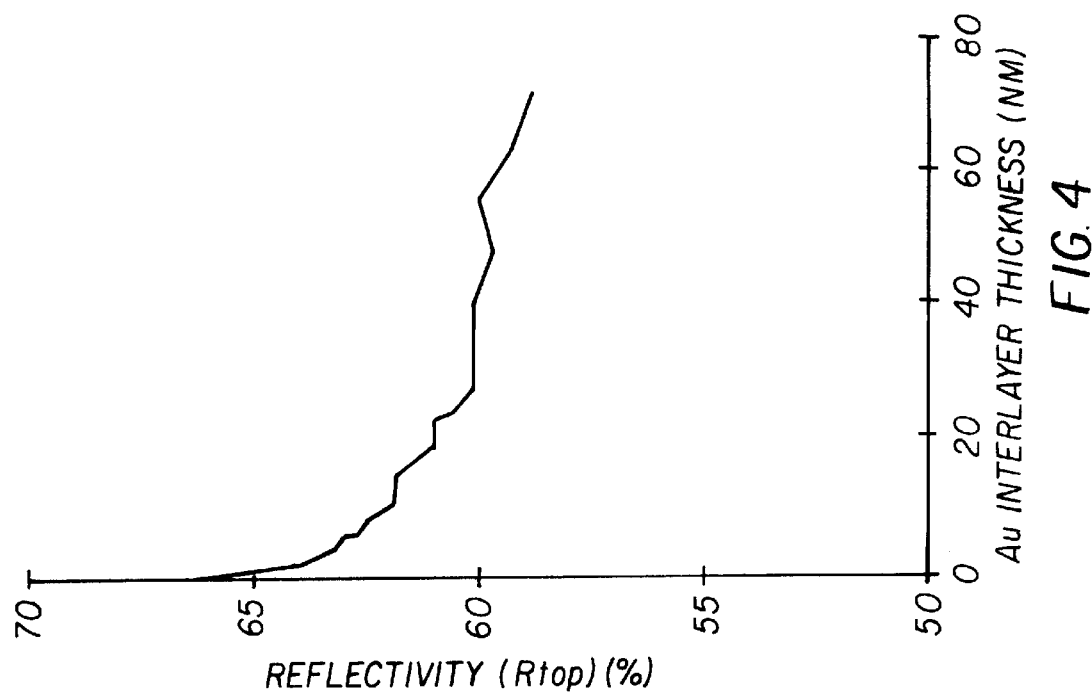
FIG. 4 is a plot of reflectivity vs. Au interlayer thickness.

FIG. 4 shows the disks reflectivity using Au metal interlayer. Again reflectivity of the silver disk with no Au layer has high reflectivity. The disk reflectivity first decreases rapidly up to 2 nm Au layer thickness but then decreases slowly up to Au interlayer thickness of 30 nm.

Figure 5:
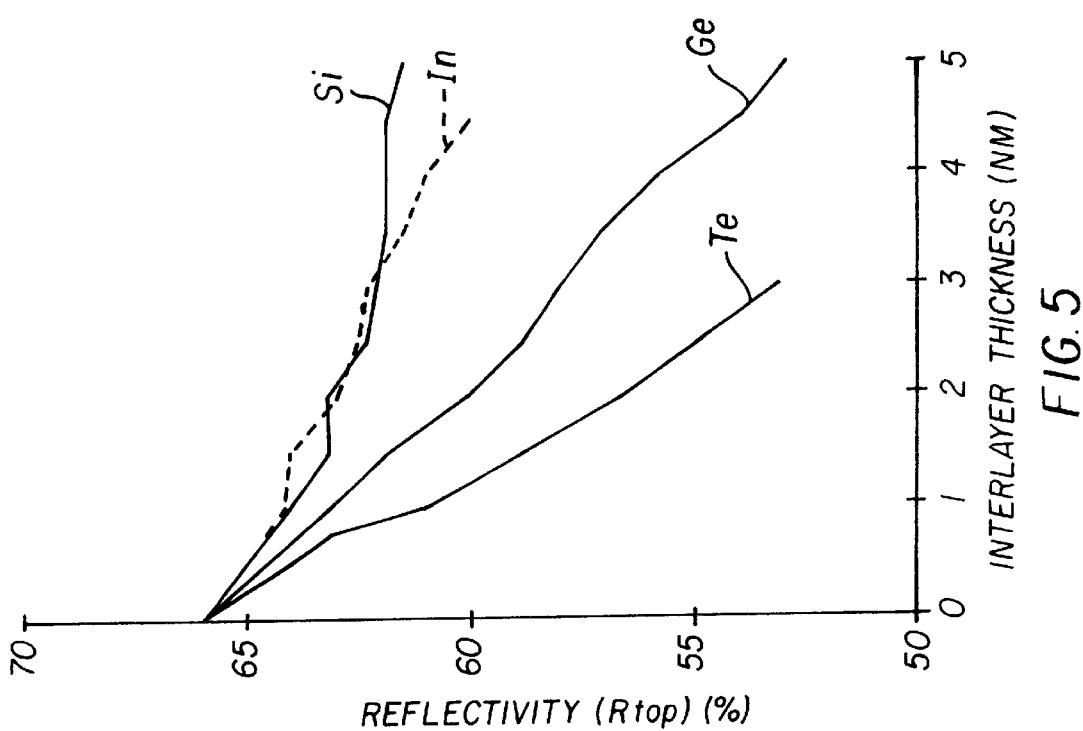
FIG. 5 is another plot of reflectivity vs. interlayer thickness for Si, Ge, In, and Te interlayer materials.

FIG. 5 shows the disks reflectivity using Si, Ge, In, and Te metal interlayers. The reflectivity of the CD-R disks decreases monotonically with increasing thickness of these interlayers.

Accelerated aging tests were carried using two conditions: high temperature dry testing at 95° C.; and high temperature/ high humidity testing at 80° C. and 85% RH. The original mark were read back after the incubation test. Disks using silver metal reflector layer, and Pd, Ni, Au, Sn, Ge, Si, Te, In, and Cr as interlayers showed significant improvement in the long term thermal stability of the disks as compared to without an interlayer in the dry testing at 95° C. Moreover, the disks with Pd, Ni, Au and Sn interlayers showed good aging stability in both the dry testing of 95°0 C. and wet testing of 80° C. and 85% relative humidity.

Figure 6:
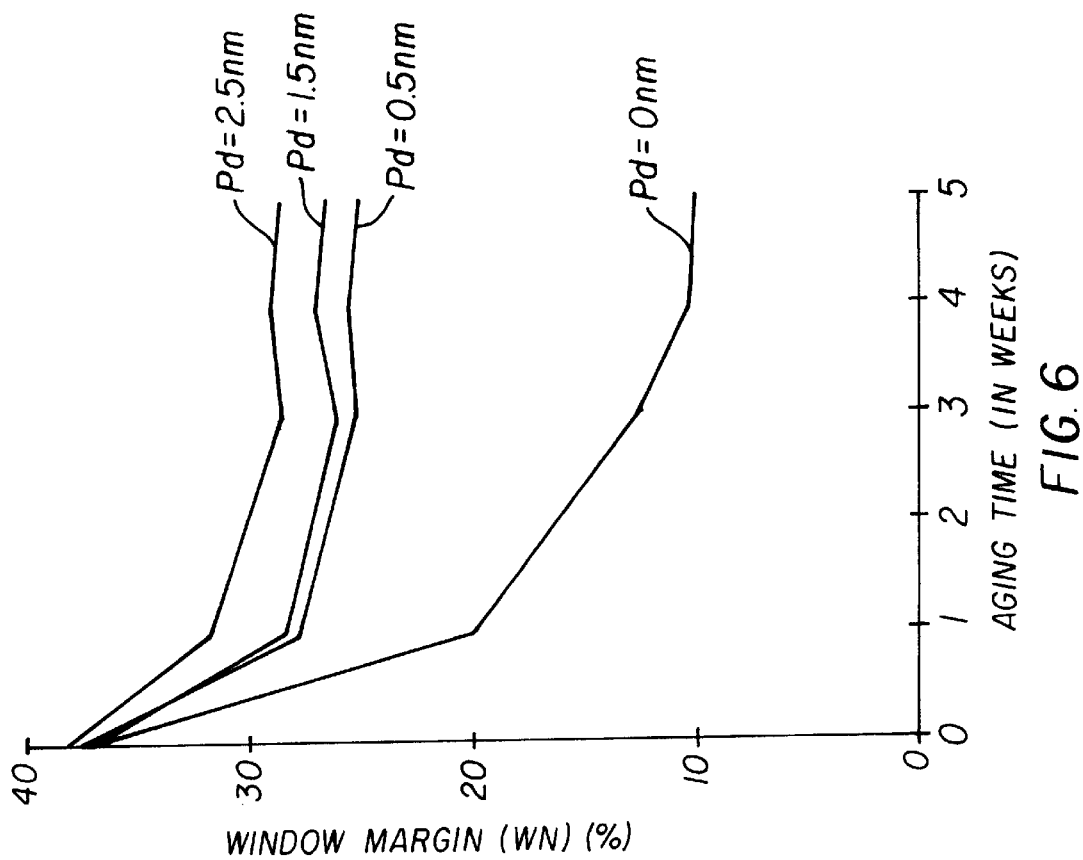
FIG. 6 is a plot of Window Margin vs. aging time for various interlayer thicknesses of palladium metal.

FIG. 6 shows the window margin of the disks using silver metal reflector with varying thickness of Pd metal interlayer as a function aging time. The test was carried out at 80° C. and 85% RH conditions. The use of thin inter layers of Pd metal improved the stability of the recorded data on the disk using silver reflector.

Figure 8:
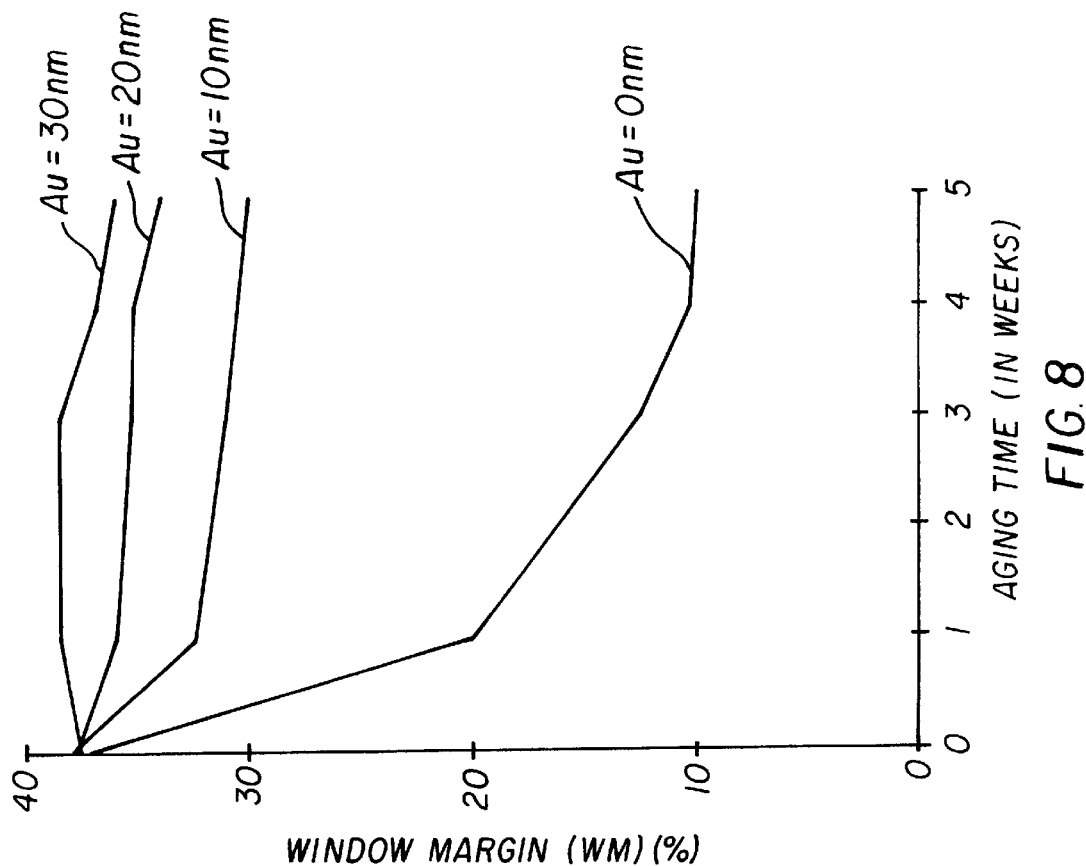
FIG. 8 is another plot similar to FIG. 6 but for a Au interlayer.
Figure 7:
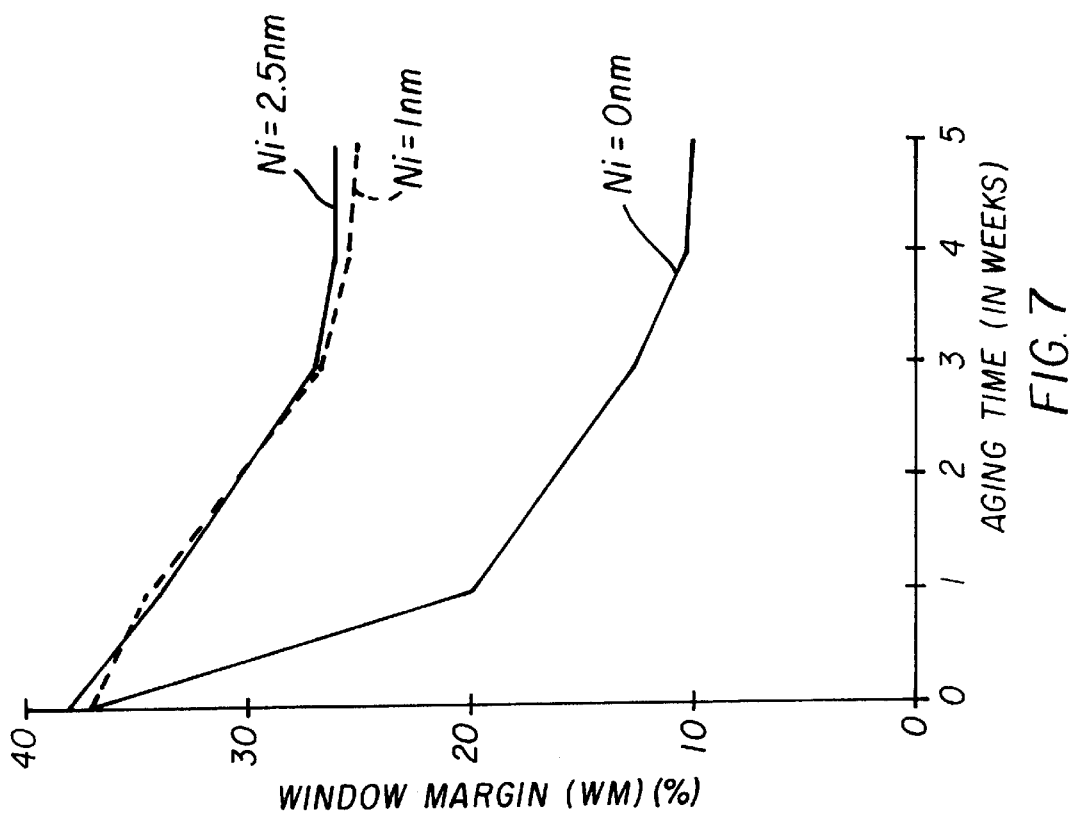
FIG. 7 is a plot similar to FIG. 6 but for a Ni interlayer.
Figure 9:
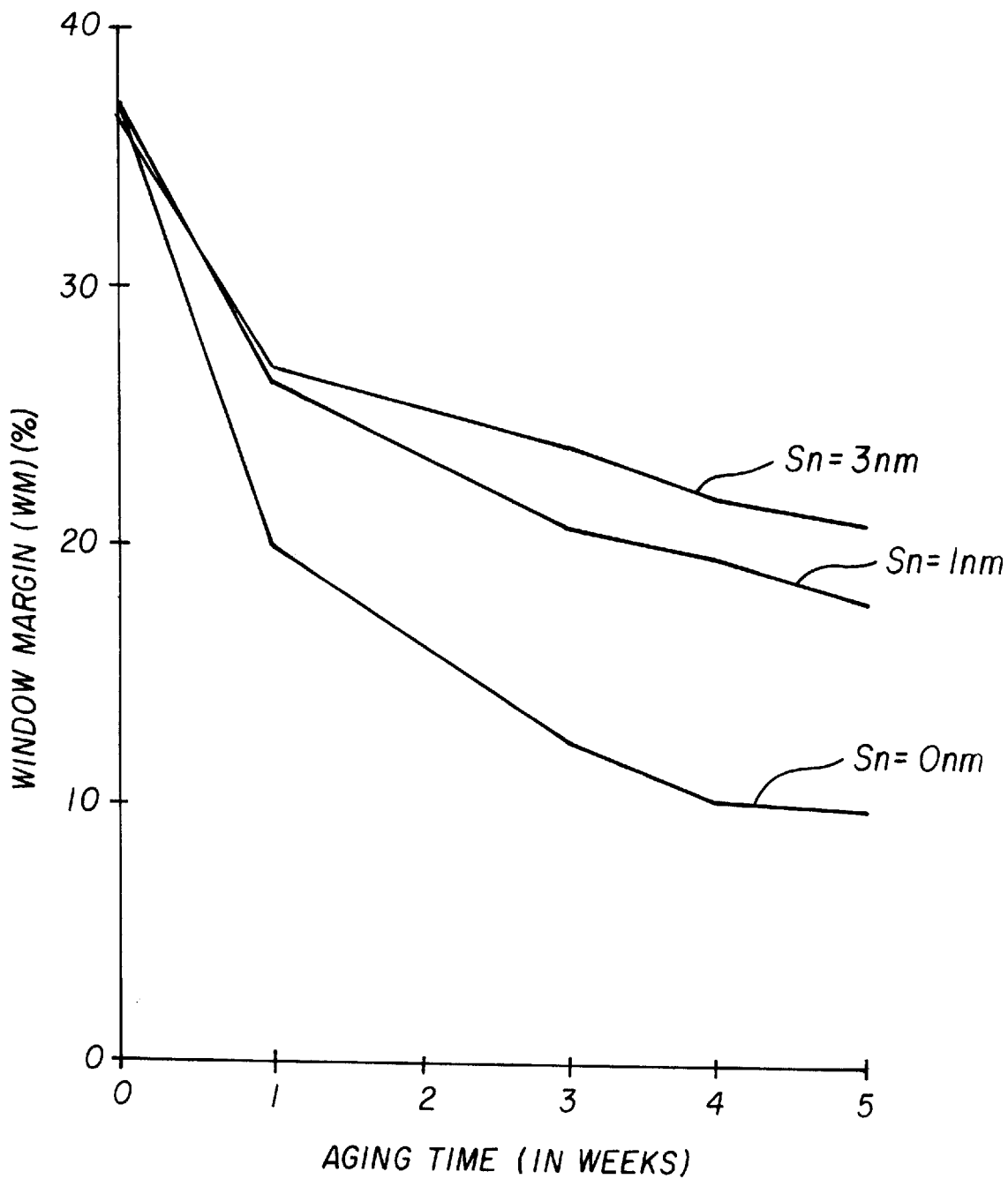
FIG. 9 is another plot similar to FIG. 6 but for Sn interlayer.

Similarly, FIGS. 7, 8 and 9 show the improved environmental stability of the CD-R disk using Ni, Au and Sn interlayers. The Window Margin and other performance is still maintained using 0.3–3.0 nm Ni and Sn and 2–30 nm Au interlayers.

Thus, the above data demonstrates that the CD-R disks with high reflectivity, high performance and high data stability can be prepared using thin interlayer of Pd, Ni, Sn, and Au metals and the silver reflecting layer. The mechanism for this improvement is not well understood. Pd and Ni are known to have very fine microstructure. The use of thin inter layers oF Pd, Ni, and Sn metals possibly improves the adhesion between the dye recording layer and the silver reflector and/or modifies the microstructure of the silver metal.

To further improve the extended environmental stability of the above disks, stable alloys of silver metal reflector such as Ag—Pd, Ag—Cu, and Ag—Ni can be used instead of pure silver as a reflecting layer. The alloying additions of 2–5% Pd, Cu, or Ni into Ag metal were found to increase the environmental stability of the silver reflector.

To further improve the stability of the disk structure and protect silver metal or silver alloy reflecting layer from corrosion/oxidation a thin protective layer of metal such as Pd, Cr, Ni, etc. or a thin layer of dielectric such as Ge—C—H, Si—N or InSnSb—O may be deposited on the reflector layer before overcoating the disk with an UV-curable protective lacquer.

The invention has been described in detail with particular reference to certain preferred embodiments thereof, but it will be understood that variations and modifications can be effected within the spirit and scope of the invention.

PARTS LIST 10 substrate
20 dye recording layer
25 metal interlayer
30 reflecting layer
35 lacquer protective overcoat

What is claimed is:

1. A recordable optical disk comprising:
   a) a transparent substrate;
   b) a recording layer having a dye formed over the substrate;
   c) a reflective layer which includes silver or silver alloys formed over the recording layer; and
   d) a thin metallic interlayer formed on the recording layer at the interface between the reflective layer and the recording layer wherein the thin metal interlayer includes materials selected from the group consisting of Pd, Ni, Sn, In, Te, Si, Ge, and alloys thereof, the interlayer being selected so as to improve the optical disk recording stability without significantly affecting the reflection of a recording light beam passing through the substrate and the recording layer and which is reflected by the reflective layer and wherein when the thin metal interlayer is Pd, Ni, Sn, In, Te, Si, Ge, or alloys thereof in a range between 0.2 nm to 3 nm.

2. The recordable optical disk of claim 1 wherein the thin metal interlayer includes materials selected from the group consisting of Pd and Ni.

3. The recordable optical disk of claim 1 wherein the recording layer includes a photosensitive material selected so as to form a mark when illuminated by laser light at a particular wavelength.

4. The recordable optical disk of claim 3 wherein the photosensitive material is an organic phthalocyanine dye.

5. The recordable optical disk of claim 1 further including an overcoat UV curable lacquer protective layer.

6. The recordable optical disk of claim 1 further including a dielectric overcoat layer on the reflective layer to protect the reflective layer and an overcoat UV curable lacquer layer on the dielectric overcoat layer.

7. The recordable optical disk of claim 1 further including a metallic layer formed on the reflective layer and a UV-curable lacquer overcoat layer formed on the metallic layer.

8. The recordable optical disk of claim 1 wherein the substrate includes a polycarbonate material.

9. A recordable optical disk comprising:
   a) a transparent substrate;
   b) a recording layer having a dye formed over the substrate;
   c) a reflective layer which includes silver or silver alloys formed over the recording layer; and
   d) a thin metallic interlayer which includes materials selected from the group consisting of Pd, Ni, Sn or alloys thereof formed on the recording layer at the interface between the reflective layer and the recording layer and selected to have a thickness in a range between 0.2 nm to 3 nm so as to improve the optical disk recording stability without significantly affecting the reflection of a recording light beam passing through the substrate and the recording layer and which is reflected by the reflective layer.

10. The recordable optical disk of claim 9 further including a dielectric overcoat layer on the reflective layer to protect the reflective layer and an overcoat UV curable lacquer layer on the dielectric overcoat layer.

* * * * *